United States Patent [19]

Harder, Jr.

[11] 4,042,663
[45] Aug. 16, 1977

[54] MONOLITHIC SEAT CUSHION AND METHOD FOR PRODUCING SAME

[75] Inventor: Arthur J. Harder, Jr., Franklin Park, Ill.

[73] Assignee: Coach and Car Equipment Corporation, Elk Grove Village, Ill.

[21] Appl. No.: 533,253

[22] Filed: Dec. 16, 1974

[51] Int. Cl.² .................. B29C 5/07; B29D 27/04
[52] U.S. Cl. .................. 264/45.7; 264/46.6; 264/46.7; 264/46.9; 264/255; 264/267; 264/310; 264/DIG. 60; 297/452; 297/DIG. 1
[58] Field of Search .............. 264/45.7, 46.6, 46.7, 264/46.9, 255, 267, 310, DIG. 60; 297/452, DIG. 1

[56] References Cited

U.S. PATENT DOCUMENTS

| | | | |
|---|---|---|---|
| 2,394,327 | 2/1946 | Niessen et al. | 264/46.7 X |
| 3,123,403 | 3/1964 | Hood | 297/452 X |
| 3,142,073 | 7/1964 | Stern | 297/452 X |
| 3,161,436 | 12/1964 | Hood | 264/46.7 X |
| 3,381,999 | 5/1968 | Steere | 297/452 X |
| 3,426,110 | 2/1969 | Kesling | 264/45.7 |
| 3,499,065 | 3/1970 | Hoskinson et al. | 264/45.7 X |
| 3,505,137 | 4/1970 | Kliene | 264/46.6 X |
| 3,531,552 | 9/1970 | Getz et al. | 297/452 X |
| 3,557,264 | 1/1971 | Getz et al. | 297/452 X |
| 3,652,748 | 3/1972 | Roberts | 264/45.7 |
| 3,859,401 | 1/1975 | Gallap et al. | 264/46.5 X |
| 3,875,275 | 4/1975 | Lemelson | 264/45.7 X |

OTHER PUBLICATIONS

Whittington, Lloyd R. "Whittington's Dictionary of Plastics," Stamford, Conn., Technomic, c. 1968, pp. 59-60 (Sponsored by Society of Plastic Engineers).

*Primary Examiner*—Philip Anderson
*Attorney, Agent, or Firm*—Merriam, Marshall, Shapio & Klose

[57] ABSTRACT

A metal seat pan is placed inside a rotational casting mold to define part of a rotational casting cavity into which is introduced rotationally castable material for forming a flexible plastic seat cover. A rotational casting operation produces a closed, hollow seat cushion shell defined by the seat pan and the flexible plastic cover. Foaming ingredients are introduced into the hollow shell to form a resilient foamed plastic interior. The resulting seat cushion is monolithic, without seams or joints and has no removable parts or mechanically joined components which will come apart from each other.

6 Claims, 5 Drawing Figures

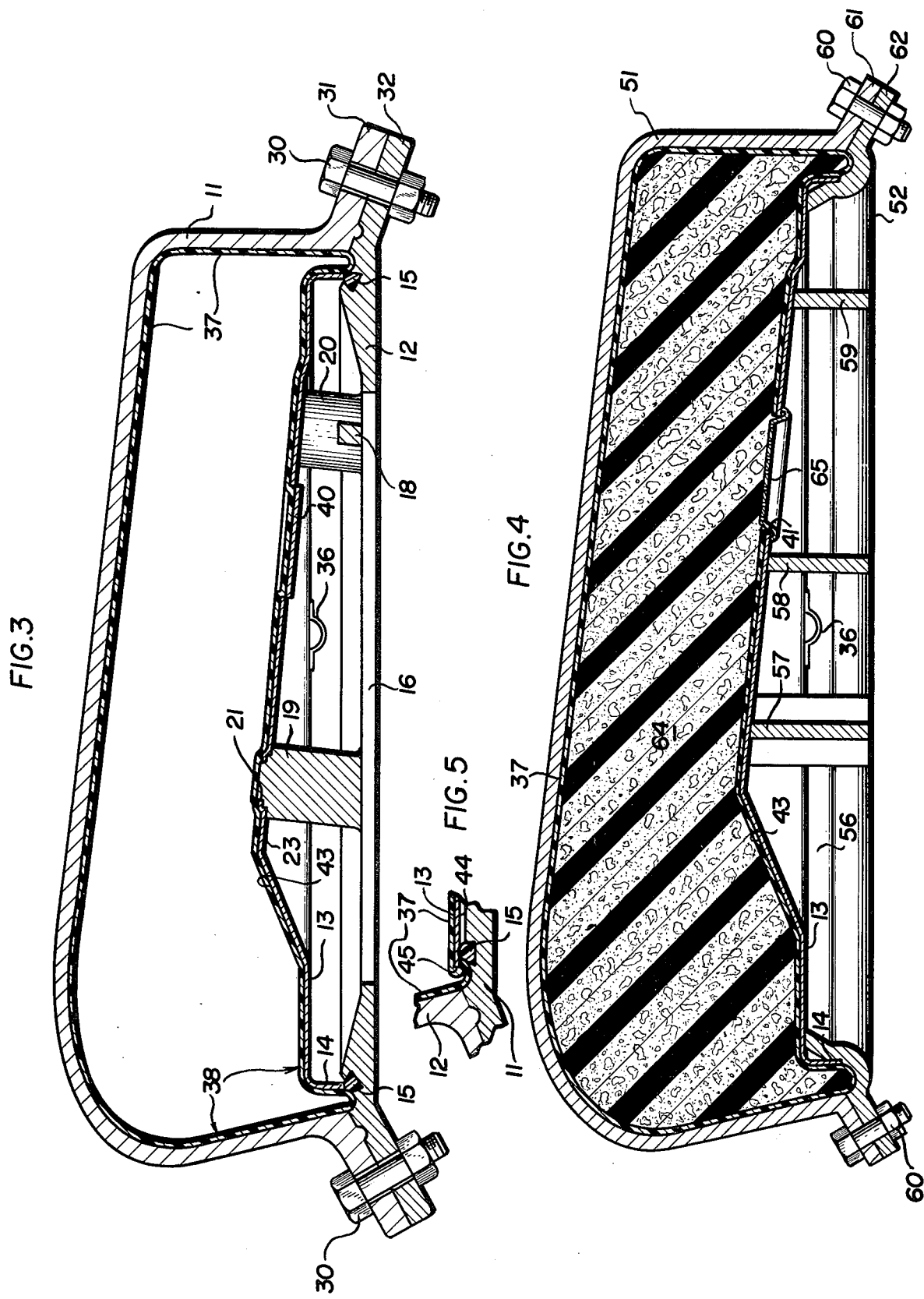

MONOLITHIC SEAT CUSHION AND METHOD FOR PRODUCING SAME

BACKGROUND OF THE INVENTION

The present invention relates generally to seat cushions and to processes for producing seat cushions. More particularly, the present invention relates to monolithic seat cushions for off-the-road vehicles, such as tractors or earth-moving equipment, and to a simple and economical manufacturing process for producing the monolithic seat cushion.

Seat cushions for off-the-road vehicles generally comprise a rigid metal pan atop which is a layer of resilient cushioning material, such as polyurethane foam, in turn covered by a flexible plastic seat cover, such as vinyl (polyvinylchloride), which is relatively strong and resistant to sun, rain, wind, frost and dirt.

Conventionally, these three components have been manufactured separately and then assembled together by skilled or semi-skilled upholstery workers who mechanically joined the cover to the pan. Such assembly techniques are relatively complicated and expensive and do not lend themselves readily to mass production. An additional drawback is that the mechanically joined components may come apart from each other during use.

SUMMARY OF THE INVENTION

The above-described drawbacks are avoided by the present invention in which a flexible plastic seat cover is rotationally cast integral with a metal seat pan to define a hollow seat cushion shell into which are introduced the raw ingredients for producing a resilient foamed plastic interior. The result is a monolithic seat cushion having a shell without seams, joints or connections and with no removable parts or components which can come apart from each other. Production of such a seat cushion does not require skilled or semi-skilled upholstery workers. The seat cushion assembling process is much simpler and more economical and more readily lends itself to mass production than conventional seat cushion assembling techniques.

Other features and advantages are inherent in the subject matter claimed and disclosed or will become apparent to those skilled in the art from the following detailed description in conjunction with the accompanying diagrammatic drawings.

BRIEF DESCRIPTION OF THE DRAWING

FIG. 3 is a sectional view taken along line 3—3 in FIG. 1 and illustrates a hollow seat cushion shell inside a rotational casting mold;

FIG. 4 is a sectional view similar to FIG. 3 illustrating the seat cushion shell inside a foaming mold with the shell filled with resilient plastic foam; and FIG. 5 is a fragmentary sectional view similar to FIG. 3 illustrating a hollow seat cushion shell containing an embodiment of a rigid seat pan different than that illustrated in FIGS. 3-4.

DETAILED DESCRIPTION OF PREFERRED EMBODIMENTS

Figure 1:
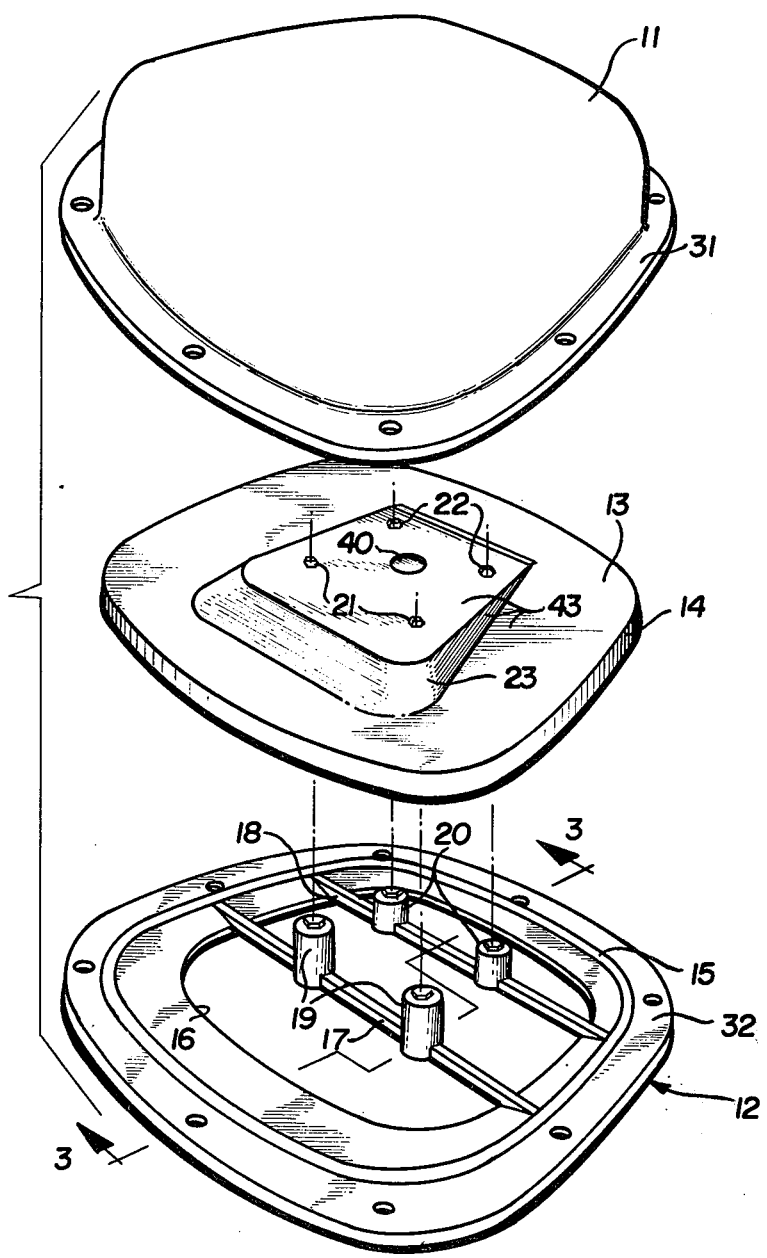
FIG. 1 is an exploded perspective of a rotational casting mold and a seat pan used in an embodiment of the present invention.

Referring initially to FIGS. 1 and 3, there is illustrated a rotational casting mold assembly having an upper mold 11 and a lower mold 12 receiving a rigid, metal pan 13 having a peripheral flange 14 which rests atop a continuous, elongated peripheral seal 15 on lower mold 12. Molds 11, 12 are typically composed of vacuum cast aluminum. Peripheral seal 15 is preferably composed of a silicone material which will withstand the temperature required to rotationally cast the flexible plastic seat cover. For example, for one type of vinyl flexible plastic seat cover, there is a required casting temperature of about 600° F.

Seal 15 conforms substantially to the periphery of rigid pan 13, and the seal is located outwardly of an opening 16 in lower mold 12. Extending across opening 16 are a pair of ribs 17, 18 upwardly from which project respective plugs 19, 20 which extend through mounting holes 21, 22 in a recess 23 on pan 13 to register pan 13 atop lower mold 12 over opening 16.

Referring to FIG. 3, after pan 13 is placed atop lower mold 12, upper mold 11 and lower mold 12 are secured together with bolt and nut connections 30 on flanges 31, 32 on upper and lower molds 11, 12 respectively. As thus assembled, upper mold 11 and lower mold 12 define part of a mold cavity, at least one wall of which is at least partly defined by pan 13.

To hold the periphery of pan 13 against seal 15 during the ensuing rotational casting operation, an external force is exerted on the pan all during the casting operation. This is accomplished by providing, on the bottom of pan 13, a pair of clamping straps 36 (only one of which is shown) each located on a respective opposite side of pan recess 23. Opening 16 of lower mold 12 provides access to the clamping straps 36 when the pan is placed in the lower mold. The external force is exerted on the pan by pulling on the clamping straps 36. This pulling force on clamping straps 36 can be maintained by tying down the clamping straps to the ribs 17, 18 on lower mold 12 or to other parts on the periphery of lower mold 12, in any convenient manner.

After clamping straps 36 have been pulled down, raw, rotationally castable plastic material is introduced into the cavity defined by the two molds and pan 13. This can be accomplished by turning upper mold 11 upside down and pouring the raw plastic material into the receptacle thus formed by inverted upper mold 11. Lower mold 12, with pan 13 clamped thereto is then inverted and placed atop upper mold 11, and the two molds 11, 12 are secured together at 30. The hollow mold cavity containing the raw plastic material is then returned to the upright position illustrated in FIG. 3 and subjected to a conventional rotational casting operation, to be more fully described below.

As an alternative, raw plastic material can be introduced into the hollow rotational casting cavity after the two molds 11, 12 are assembled together. This can be accomplished by removing a knockout blank 40 in the bottom of pan 13 to create an opening 41 (FIG. 4), inverting the mold assembly from the position shown in FIG. 3, introducing raw plastic material through the opening 41 and then plugging opening 41 with a conventional plug arrangement (not shown).

The plastic material for the seat cover is typically a polyvinylchloride plastisol which, when cast, has a hardness, on the Shore A scale, in the range 45-90. One embodiment has the following features and properties:

| Hardness, Shore A scale | 75 |
|---|---|
| Tensile Strength, P.S.I. | 2100 |
| Tear Strength, P.S.I. | 260 |
| Elongation | 360% |
| Volatility, Activated Carbon | 2.3% |
| Low Temperature Flex, ASTM D 1790-62 | −40° F |

In its raw, uncast, condition, the above-described plastisol has the consistency of pancake syrup at room temperature.

Other plastic material may be used for the flexible plastic seat cover so long as the material is rotationally castable into a relatively uniform thickness (e.g., 0.04-0.07 in.) and otherwise conforms with the properties and characteristics desired for the flexible plastic seat cover, as described herein. These include the ability to withstand rain, sunlight, dust, temperatures in the range −30° F to 150° F and sufficient strength to withstand the load forces of a full-size male seat occupant bouncing up and down from the usual bumping encountered on off-the-road operations.

After the raw plastic material is introduced into the rotational casting cavity, the mold assembly is subjected to a conventional rotational casting operation in which the assembly is heated and rotated about both a horizontal and a vertical axis. This can be accomplished by rotating the mold inside an oven heated to the temperature required for the plastic seat cover material to form a shell. The rotational casting operation causes the raw plastic material within the mold to form, with pan 13, a closed, hollow seat cushion shell 38 having at least one wall defined at least in part by pan 13 and having its remaining wall portions composed of flexible plastic material 37 (FIG. 3). As shown in FIG. 3, the flexible plastic material is applied to rigid pan 13 along its periphery, adjacent seal 15 and to one side of the seal (the left or inner side as viewed in FIG. 3), but the flexible plastic material is not applied to pan 13 on the other side of seal 15 opposite said one side. In other words, during the casting operation, seal 15 prevents flow or leakage of the plastic material outside the mold cavity at the periphery of pan 13.

At the completion of the rotational casting operation, the clamping straps 36 are untied from the lower mold 12, the upper and lower molds are disassembled and hollow seat cushion shell 38 is removed fromm the molds.

Referring to FIG. 4, hollow shell 38 is then placed within a second or holding mold assembly for filling the interior of shell 38 with resilient plastic foam.

The holding mold assembly comprises an upper mold 51 and a lower mold 52 having an opening 56 across which extend ribs 57, 58, 59 atop which rests pan 13 of hollow shell 38. Upper and lower molds 51, 52 are secured together by nut and bolt connections 60 at flanges 61, 62 on upper and lower molds 51, 52 respectively.

The ingredients for producing the resilient foamed plastic interior are introduced into hollow shell 38 by inverting the assembly shown in FIG. 4 and pouring the ingredients through opening 41, after first cutting out the flexible plastic material which formed over opening 41 during the rotational casting operation. After the foam ingredients are introduced, opening 41 is plugged using conventional plug means (not shown), and the foaming operation is allowed to proceed within hollow shell 38 to completely fill the shell's interior with resilient foamed plastic.

The ingredients introduced into hollow shell 38 for producing a foamed plastic interior are those conventionally used to produce resilient, foamed plastic cushion interiors, such as polyurethane foam ingredients. Other foam compositions may be used so long as they produce a foamed resilient cushion interior. Both the foam composition and the foaming operation are essentially conventional. Typically, the process embodies a cold foaming operation in which the foam is cured at room temperature. The compression characteristics of the foamed plastic interior can be varied, using conventional techniques, in accordance with the requirements of the user. In one typical embodiment, the foamed plastic interior has a compression load deflection test value, ASTM D2406-65T, of 45-50 lbs.

Seat cushion shell 38 is enclosed by and maintained within the holding mold until the foaming operation is completed. The holding mold (FIG. 4) has inside parameters conforming to those of the rotational casting mold (FIG. 3) so that the resulting foam-filled seat cushion (FIGS. 2 and 4) has exterior dimensions conforming to those of hollow seat cushion shell 38 before the foam was added (FIG. 3). Alternatively, the holding mold may have parameters slightly larger than those of the first mold (FIG. 3) to permit a slight expansion of the hollow seat shell when the foamed interior forms. In neither case will the plastic portions of the seat shell be squeezed into folds or wrinkles within the second mold during the foaming operation.

After the foam has formed and cured, a perforated breathing plug 65 is inserted in hole 41.

Figure 2:
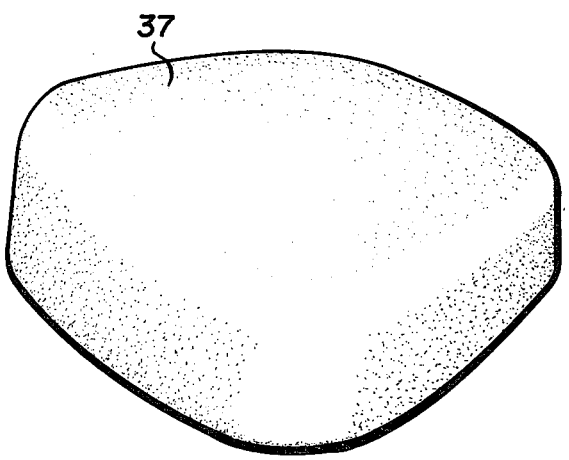
FIG. 2 is a perspective of a seat cushion produced in accordance with the present invention.

The result of the operations described above is a monolithic seat cushion, illustrated in FIGS. 2 and 4, comprising a rigid metal seat pan 13 to which is integrally cast a flexible, plastic seat cover 37 without seams or joints, the pan and seat cover defining a shell having an interior filled with resilient foamed plastic at 64 (FIG. 4). The seat cushion has no removable parts. Metal pan 13 defines at least a portion of at least the bottom wall of the shell and flexible plastic seat cover 37 defines the remaining wall portions not defined by the pan. There is an adhesive bond between flexible plastic seat cover 37 and metal pan 13 at the periphery of pan 13 (at flange 14 in the embodiment of FIGS. 1–4) and also preferably on the pan's upper surface 43, the surface facing the interior of shell 38. The adhesive bond between plastic seat cover 37 and pan 13 forms a metal-plastic laminate shell wall at those portions of the shell of which the pan defines at least a part of the shell wall.

There are no seams, joints or connections between flexible plastic cover 37 and metal pan 13 other than the adhesive bond described above. The seat cushion shell is moisture proof and weather tight.

In a preferred embodiment, the adhesive bond is obtained by coating the metal pan 13 with a primer or adhesive bonding agent, prior to placing pan 13 within the rotational casting mold. This adhesive bonding agent is typically composed of a combination of resins dissolved in a solvent such as methyl ethyl ketone or formed into a dispersion/emulsion with water. Examples of the solution-type primer include:

| Ingredient | % Range | % Preferred |
| --- | --- | --- |
| acrylic resin | 7-14 | 10 |
| phenolic resin | 2.5-5 | 3 |
| epoxy resin | 4-8 | 6 |
| solvent | balance | balance |

Examples of the emulsion/dispersion-type primer may contain about 50% water with the resins being in the same relative proportions to each other as set forth above. The above-described primer is applied to pan 13 and baked on before the pan is placed in lower mold 12. This primer adheres very tenaciously to the metal pan, and flexible plastic seat cover 37 adheres very tenaciously to the primer. Without the primer, the flexible plastic 37 would not adhere to the metal pan to the extent desired.

When using the adhesive bonding agent described above, the resulting adhesive bond between flexible plastic seat cover 37 and metal pan 13 exceeds the tensile strength of the plastic seat cover, by one to two orders of magnitude.

The metal pan is typically composed of 16 gauge steel (0.062 in. thick). To enhance the adherence of the bonding agent to the upper side of steel pan 13 and the adherence of paint to the lower side of the steel pan, the pan is subjected to a conventional iron phosphating treatment in which the pan is dipped in or sprayed with a conventional iron phosphating solution to produce a coating of iron phosphate on both surfaces of pan 13.

In the embodiment illustrated in FIGS. 1-4, pan 13 is illustrated as having a peripheral flange 14 extending around the entire periphery of the pan. In some embodiments, part or all of flange 14 may be absent (see FIG. 5). In such a case, the engagement of peripheral seat 15 with pan 13 is with the bottom surface 44 of pan 13 adjacent peripheral edge 45 of the pan, as illustrated in FIG. 5.

The seat cushion illustrated in FIGS. 2-4 is armless. However, the process described herein is equally applicable to a seat cushion having arms integral therewith. In such an embodiment, arm portions would extend upwardly from the periphery of pan 13 as integral parts thereof, and upper and lower molds 11, 12 would be shaped to cast a hollow shell including hollow arm portions. As an alternative, the process described herein can be used to produce discrete seat arms, separate from the seat cushion. The same process can, of course, also be used to produce a seat back.

If desired, the interior surface of upper mold 11 may be textured, grooved, ridged, etc. to impart a "graining" effect or style lines or the like to the outer surface of the plastic seat cover.

The foregoing detailed description has been given for clearness of understanding only, and no unnecessary limitations should be understood therefrom, as modifications will be obvious to those skilled in the art.

What is claimed is:

1. A process for manufacturing a seat cushion having a rigid pan, a flexible plastic seat cover, and a resilient, foamed plastic interior, said process comprising the steps of:
   providing a rotational casting mold having a first part and a second part with an opening therein;
   providing, on said second mold part, a continuous, elongated seal located outside the periphery of said opening and conforming substantially to the periphery of said rigid pan;
   placing said rigid pan in said second mold part over said opening and against said continuous seal and engaging said pan with said continuous seal along the periphery of said pan;
   assembling said first mold part, said second mold part and said pan to define a closed mold cavity at least one wall of which is at least partly defined by said pan;
   introducing, into said cavity, rotationally castable raw plastic material for said flexible plastic seat cover;
   heating and rotating said mold, with said raw plastic material within the mold, to form a closed, hollow seat cushion shell having at least one wall defined at least in part by said rigid pan and having its remaining wall portions composed of said flexible plastic material rotationally cast integral with said pan;
   said last recited step comprising bonding said flexible plastic wall parts integrally with said rigid pan along the periphery of said pan adjacent said continuous seal;
   holding said pan against said seal during said heating and rotating steps to prevent leakage of said plastic material outside said mold cavity at the periphery of said pan;
   introducing, into said hollow cushion shell, unfoamed ingredients capable of foaming to produce said resilient, foamed plastic interior;
   and foaming said last recited ingredients within said shell to completely fill the shell's interior with resilient foamed plastic.

2. A process as recited in claim 1 and comprising:
   covering the surface on those parts of the rigid pan to be contacted by said flexible plastic material with an adhesive bonding agent, prior to the introduction of said raw plastic material into said cavity, to effectuate said bonding of the flexible plastic wall parts with said rigid pan.

3. A process as recited in claim 1 wherein said holding step comprises:
   exerting an external force on said rigid pan, from outside said mold, through said opening, to hold the pan against said seal.

4. A process as recited in claim 3 and comprising:
   providing a clamping strap on the outside surface of said rigid pan;
   providing access to said clamping strap, when the pan is placed in said second mold part, through said opening in the second mold part;
   and pulling on said clamping strap to exert said external force on said pan.

5. A process as recited in claim 1 and comprising:
   removing said hollow seat cushion shell from said rotational casting mold;
   providing a holding mold having inside parameters conforming to those of said rotational casting mold;
   and enclosing said hollow seat cushion shell within said holding mold before the introduction of said foaming ingredients into the shell and maintaining said seat cushion shell in said holding mold until the foaming operation is completed.

6. A process as recited in claim 1 wherein said raw plastic material for said flexible plastic seat cover is a plastisol.

* * * * *